Jan. 20, 1931.　　　F. A. COX　　　1,789,728
CONNECTING ROD BEARING
Filed Jan. 17, 1928　　　2 Sheets-Sheet 1
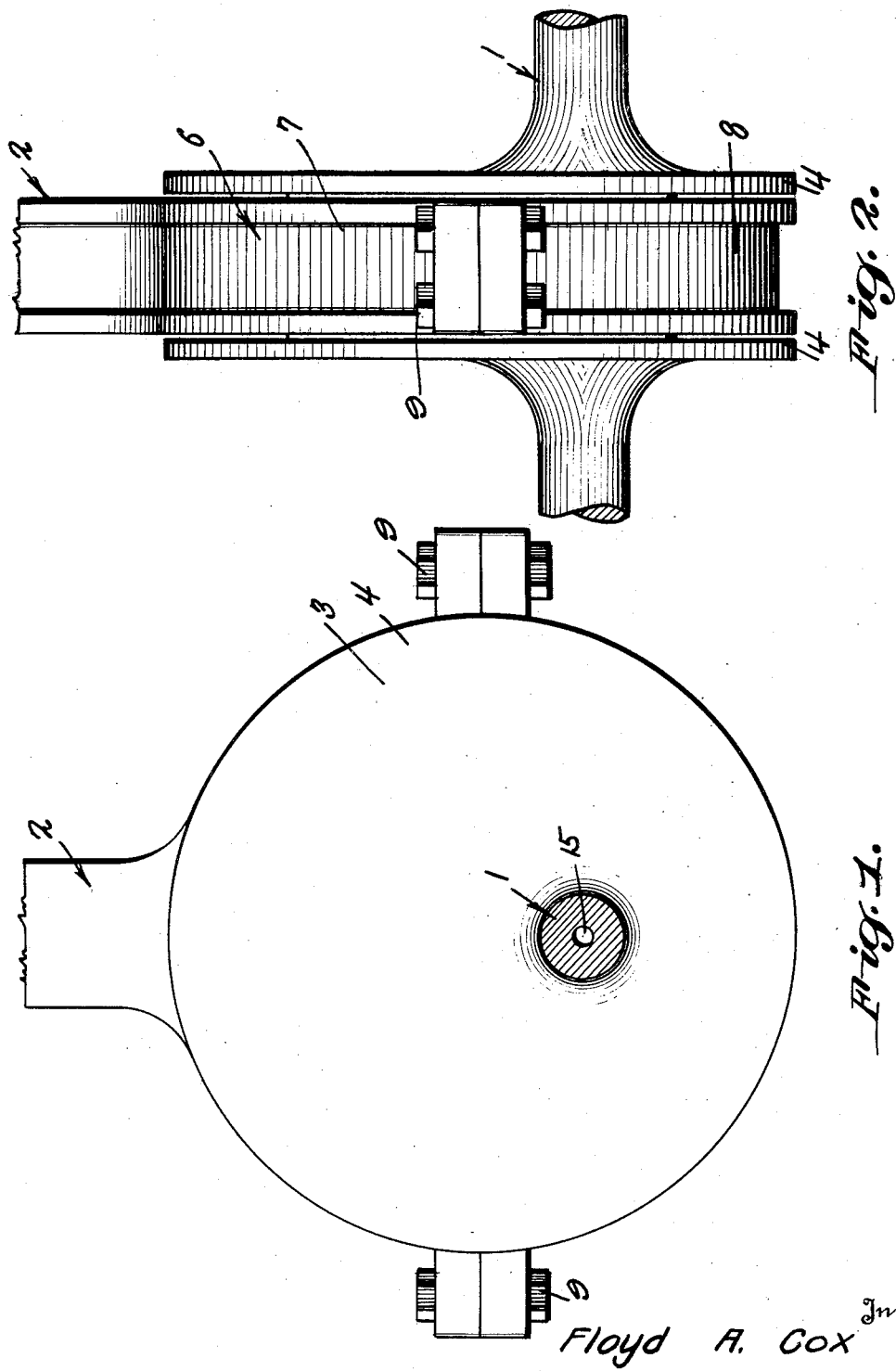
Floyd A. Cox, Inventor Jan. 20, 1931.  F. A. COX  1,789,728
CONNECTING ROD BEARING
Filed Jan. 17, 1928   2 Sheets-Sheet 2
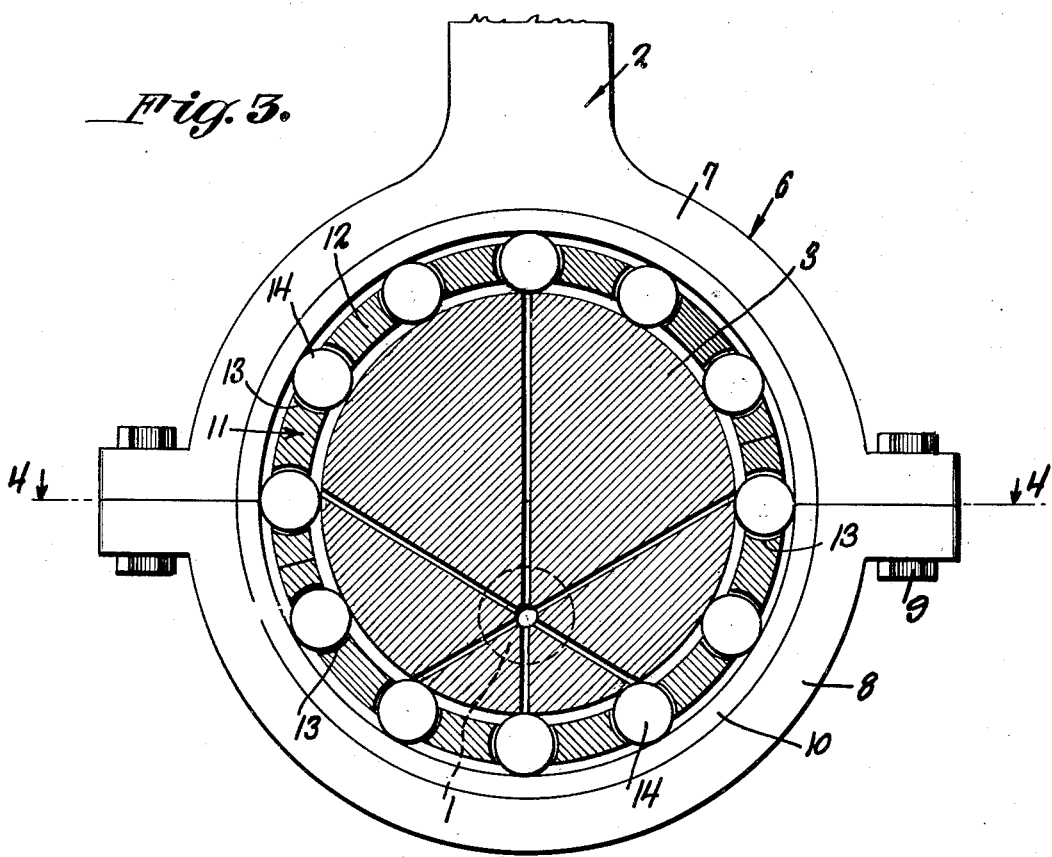
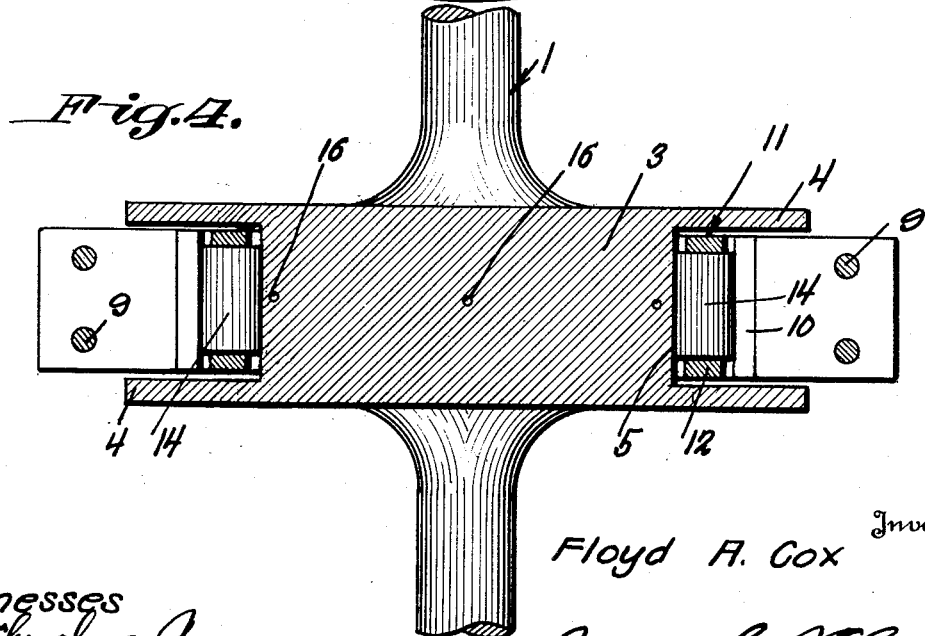
Floyd A. Cox, Inventor.
Witnesses Patented Jan. 20, 1931

1,789,728

UNITED STATES PATENT OFFICE

FLOYD A. COX, OF DE SOTO, KANSAS

CONNECTING-ROD BEARING

Application filed January 17, 1928. Serial No. 247,356.

This invention relates to improvements in connecting rod bearings and has as its general object to provide a connecting rod bearing which will overcome the disadvantages presented by the ordinary bearings as heretofore constructed.

In the ordinary connecting rod bearing, as employed on crank shafts, there is, as is well known, considerable wear on the bearing due to the frictional contact of the connecting rod bearing with the crank of the shaft, and, as a consequence, there is a certain loss of power and, furthermore, the bearing must be frequently adjusted in order to compensate for wear and, after a period of use, it must be relined. The present invention therefore has as its primary object to provide a connecting rod bearing which will overcome these disadvantages and which will, to a very considerable extent, eliminate friction between the connecting rod bearing and the bearing member upon the shaft with which the rod is connected, the invention further contemplating a bearing of such character that, due to the minimum frictional contact between its component parts, there will be no occasion for adjustment of the bearing or replacement of any parts thereof even after an exceptionally long period of use.

Another disadvantage attending the use of a crank shaft and connecting rod connected therewith, is that steady rotation of the shaft is impaired because of the eccentric positioning of the cranks and the overbalancing effect thereof on the crank shaft as a whole, and therefore the present invention has as a further object to provide a connecting rod bearing in which this difficulty will be overcome and in which the bearing members upon the shaft to be driven, and corresponding to the usual crank shaft, will serve as counterbalancing elements thus insuring of more even rotation of the shaft and consequently a more steady application of power.

A further object of the invention is to provide novel means whereby the bearing, embodying the invention, may be effectually automatically lubricated.

While the accompanying drawings and the description which is to follow, constitute a disclosure of the preferred embodiment of the invention, it will be understood that various changes may be made within the scope of what is claimed.

In the accompanying drawings:

Figure 1 is a view in side elevation of the bearing embodying the invention, the driven shaft being shown in section;

Figure 2 is a view in elevation looking at the side of the bearing, the driven shaft being broken away at opposite sides of the bearing;

Figure 3 is a vertical transverse sectional view through the bearing;

Figure 4 is a horizontal sectional view through the bearing taken substantially on the line 4—4 of Figure 3 looking in the direction indicated by the arrows.

It will be understood of course that the connecting rod bearing, embodying the invention, is to be employed upon the connecting rods and driven shaft of an internal combustion engine or employed in other mechanisms where connecting rods establish driving connection between a source of power and a shaft to be driven or, even where motion is to be transmitted from a rotary shaft to other parts through the medium of a connecting rod, and therefore, in the drawings, but one of the connecting rods and bearings is illustrated as this will suffice to demonstrate the principles of the invention.

In the drawings the shaft with which the connecting rod is connected, is indicated by the numeral 1, and the connecting rod is indicated in general by the numeral 2, and in accordance with the invention, the shaft 1 is provided with one or more eccentrics 3, at spaced points in its length. The eccentric 3 is preferably formed integral with the shaft 1, although it may be formed separate therefrom and secured upon the shaft, and, as clearly shown in Figures 2 and 4 of the drawings the eccentric is provided with spaced peripheral flanges 4 providing between them a channel 5 extending circumferentially about the eccentric, this channel serving to house the bearing of the present invention as will now be described.

The bearing comprises a collar at the end of the connecting rod 2 which collar is indicated in general by the numeral 6 and comprises a pair of substantially counterpart sections or halves, one, indicated by the numeral 7, being integrally formed upon the end of the connecting rod, and the other, indicated by the numeral 8, being assembled with the collar section 7 and the two sections being separably held assembled through the medium of bolts 9. Semi-annular lining members 10 are arranged within the sections 7 and 8 of the bearing collar and are of a suitable bearing metal and capable of being removed and replaced in the event of wear, after a long period of use. It will be observed by reference to the drawings, and particularly Figures 2 and 4 thereof, that the collar comprising the sections 7 and 8, is housed between the flanges 4 defining the channel 5 and that the inner surfaces of the lining members 10 are concentric to the peripheral surface of the eccentric 3 and spaced therefrom.

The bearing further comprises a bearing race 11 consisting of a pair of semi-annular sections 12 which are disposed within the channel 5 between the flanges 4, the race sections having their ends in matching relation as illustrated in the drawings and each section being formed with a series of pockets 13 in which are rotatably mounted the anti-friction elements of the bearing which are in the form of cylindrical rollers 14, these rollers being preferably formed directly within the seats 13 and the opposite side walls of each seat being of approximately semi-cylindrical contour and conforming more or less closely to the surface of the respective roller, so that each of the race sections supports a series of the anti-friction rollers. It will be observed by reference to Figures 3 and 4 of the drawings that the space between the peripheral surface of the eccentric 3 and the inner surface of the lining comprising the sections 10, is equal substantially to the diameters of the rollers 14 and that the said rollers contact these surfaces, the race sections being of a width equal substantially to the width of the channel 5, so that they are freely confined within the channel and between the periphery of the eccentric 3 and the inner surface of the lining 10, the inner and outer peripheral surfaces of the race sections being however spaced a short distance from the said peripheral surface of the eccentric 3 and the inner surface of the lining 10, due to the peripheral contact of the bearing rollers with these surfaces.

In order that lubricant may be supplied to the anti-friction rollers, the shaft 1 is formed longitudinally with a lubricant conducting bore indicated by the numeral 15, and the eccentric 3 is formed with a plurality of oil ducts 16 which radiate from the bore 15 and extend to the periphery of the eccentric 3 at various spaced points about the said periphery of the eccentric.

From the foregoing description of the invention it will be evident that the eccentrics 3 constitute counterweights and therefore insure of a smooth and steady rotation of the shaft 3, where the shaft is a driven shaft, and will, likewise, insure of a steady and continuous delivery of power from the shaft where the shaft is a drive shaft. It will also be evident from the foregoing description that the rollers 14 serve to reduce the friction between the eccentric and the bearing collar of the connecting rod, to a minimum, so that no adjustments or repairs are rendered necessary for a long period of use of the bearing.

It will also be evident from the foregoing that, in the operation of the shaft and connecting rod, lubricant will be distributed from the bore 15 through the ducts 16 to the surfaces of the eccentric 3 and lining 10 and therefore to the surfaces of the bearing rollers 14.

Having thus described the invention, what I claim is:

A power transmission means comprising a shaft, having an eccentric provided with a peripheral channel, a connecting rod having a bearing collar fitting within said channel, a bearing cage mounted within said channel between the eccentric and the collar, and comprising abutting single piece semicircular sections, each section having a series of closed end sockets formed therein, and roller bearings housed within each socket, the side walls of the sockets conforming to the contour of said rollers, said bearing cage being of less thickness than the diameter of said bearings, for causing said bearings to project beyond the inner and outer faces of said cage, and support said bearing cage in spaced relation with respect to the bearing face of the eccentric and said collar, the side walls of said sockets constituting means for assisting in holding the cage out of contact with the bearing faces of the eccentric and said collar.

In testimony whereof I affix my signature.

FLOYD A. COX.